Figure 1:
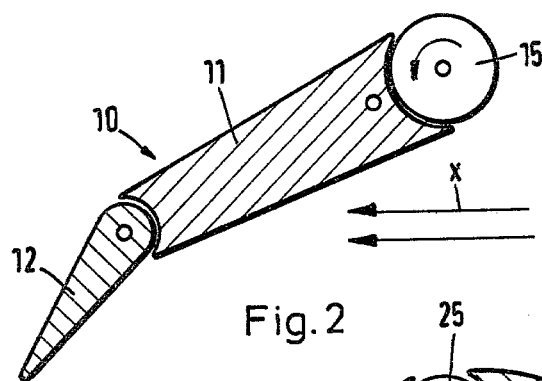

United States Patent [19]

Jastram et al.

[11] 4,307,677

[45] Dec. 29, 1981

[54] RUDDER FOR AQUATIC CRAFT AND FLOATING APPARATUS

[75] Inventors: Peter Jastram, Wentorf; Claus Jastram; Jochim Brix, both of Hamburg, all of Fed. Rep. of Germany

[73] Assignee: Jastram-Werke GmbH KG, Hamburg, Fed. Rep. of Germany

[21] Appl. No.: 35,102

[22] Filed: May 1, 1979

[30] Foreign Application Priority Data

May 10, 1978 [DE] Fed. Rep. of Germany ....... 2820355

[51] Int. Cl.³ .......................................... B63H 25/06
[52] U.S. Cl. ................................. 114/167; 114/162; 114/144 R; 244/206
[58] Field of Search ......................... 244/21, 39, 206; 114/144 R, 162, 163, 164, 166, 167, 168

[56] References Cited

U.S. PATENT DOCUMENTS

| | | |
|---|---|---|
| 1,540,079 | 6/1925 | Luchsinger ...................... 114/167 |
| 3,162,402 | 12/1964 | Alvarez ........................... 244/206 |
| 3,448,714 | 6/1969 | Brooks ............................ 244/206 |
| 3,467,045 | 9/1969 | Bröhl .............................. 114/167 |
| 4,100,876 | 7/1978 | Feleus ............................ 244/206 |

*Primary Examiner*—Trygve M. Blix
*Assistant Examiner*—D. W. Keen
*Attorney, Agent, or Firm*—Toren, McGeady and Stanger

[57] ABSTRACT

The invention relates to a rudder for aquatic craft wherein the rudder member is provided with a fin which is pivotable independently thereof and with a rotor on the front edge of the rudder member and/or between the latter and the fin or between the rudder member and a guide member mounted in front of said rudder member.

2 Claims, 7 Drawing Figures

RUDDER FOR AQUATIC CRAFT AND FLOATING APPARATUS

The invention relates to a rudder for aquatic craft and floating apparatus.

As a rule, rudders are displacement means mounted singly or in greater numbers on the stern, which, with or without any propeller action, produce the rudder force needed to steer the ship, when set to a rudder angle. However, control means mounted in the forecastle region and, for example, in the legs of drilling platforms or on the float members of semi-submersible craft should also be classed as rudders.

Aquatic craft and floating apparatus are defined as stationary or moving displacement bodies and structures, offshore platforms and drilling platforms. Towed vehicles such as transport pontoons or lighters and floating docks are also regarded as aquatic craft and floating apparatus.

It is known that about ⅔ of the rudder action is produced on the suction side and about ⅓ on the pressure side. Depending on the ratio of the sides of the rudder and its arrangement inside or outside the slipstream, flow separation occurs on the suction side at a rudder angle of between 15° and 35°. To remedy this, slats have been adopted in aviation, whereas in nautical engineering, where the rudder has to operate on both sides, driven and hence disengageable rotors have proved satisfactory, which are housed either in the front edge of the rudder or inside the bends of multipart rudders. The drive power of such rotors is very small compared with the effect which can be obtained. The pressure-side effect of a ship's rudder can be improved by means of fins mounted on the rear edge of the rudder so as to be positively controlled or driven and hence capable of being disengaged thereby.

Guide head rudders and semi-pivoting rudders are known, for separating the bending couple of the rudder from the shank couple. One known rudder mounting consists of a hollow shaft which absorbs the bending couple and a solid shaft extending concentrically therein which transmits the rudder torque.

Generally, there is only a limited lateral surface available for the ship's rudder. Its height is restricted by the counter line at the top and by a minimum spacing from the base at the bottom. Lengthening is ruled out by the rear edge of the ship and the minimum clearance for the propeller, and by the disadvantageous hydrodynamic effect of long rudders on the gradient of the rudder force as a function of the rudder angle. Thus, enlargement of the lateral surface alone is not always a suitable or practical way of increasing the rudder forces. Moreover, this would increase the drag resistance, the weight of steel and the rudder couples. The propulsion characteristics would also deteriorate owing to the increase in the thickness of the profile which would necessarily result therefrom.

The aim of this invention is to provide a rudder for aquatic craft, more particularly for large to moderately large aquatic craft and floating apparatus, which operates as a normal single-body rudder at conventional service speeds and, when necessary, i.e. in the case of reduced movement in dangerous areas and in restricted waters, can be converted into a high-performance rudder with an increased action on the pressure side and with control of the suction side, by the activation of rudder elements.

To achieve this aim, a rudder is proposed which is characterised, according to the invention, by:

a rudder member provided on its rear with a fin which is pivotable independently of the rudder member, this fin being capable of being fixed by means of devices mounted in the rudder member or in the fin, at least one activated element constructed as a rotor, which is mounted on the front edge of the rudder member and/or between the said rudder member and the fin, or between the rudder member and a fixed structure such as a guide head or the like provided in front of said rudder member, and by the rotary construction of each rotor as a function of the adjustment of the rudder in the approach flow direction, whilst the surface of the rotor on the suction side is adapted to be movable in alignment with the approach flow.

The advantage of the construction of the rudder according to the invention is that the ship's rudder is provided with elements which are driven and disconnected from within. These additional activated elements consist of rotors for controlling the suction side and fins for increasing the effect of the pressure side. This high-performance rudder does not require any special reinforcement of the attachment portions of the rudder or of the ship, as it can be operated as a conventional single-body rudder at normal service speeds. When following a course, it is even possible to steer by means of the fin alone, with the arrested main rudder acting as additional deadwood and thus substantially increasing the steadiness of the course. Only at lower speeds, when the rudder action decreases in known manner, are the rotor and fin activated, so that the full effect of the high-performance rudder is put to use. If the main rudder is blocked, the driven fin can be used as an emergency rudder. If the blocked main rudder is not in the amidships position, the resultant undesirable rudder action can be at least partially stopped by the rotation of the rotor in the opposite direction, to facilitate steering with the fin. Moreover, an over-large rudder angle of more than 35° is found to be particularly advantageous.

Thus, compared with the rudder arrangements known hitherto, the rudder according to the invention is a considerable improvement. Basically, this rudder helps to cope with dangerous situations and avoid the consequences of accidents at sea, some of which can be traced back to faulty rudder action or the breakdown of the rudder.

Figure 2:
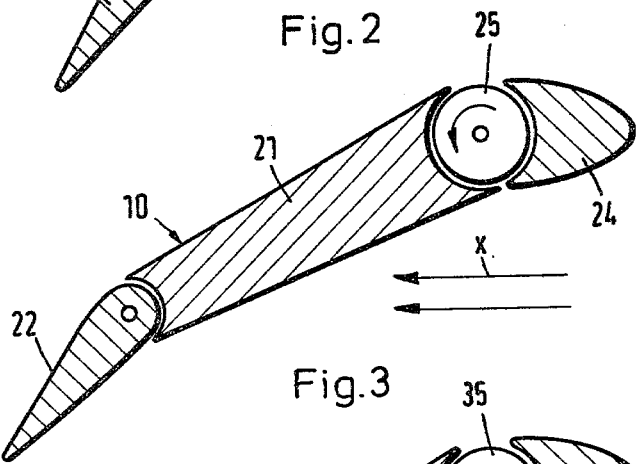
Figure 3:
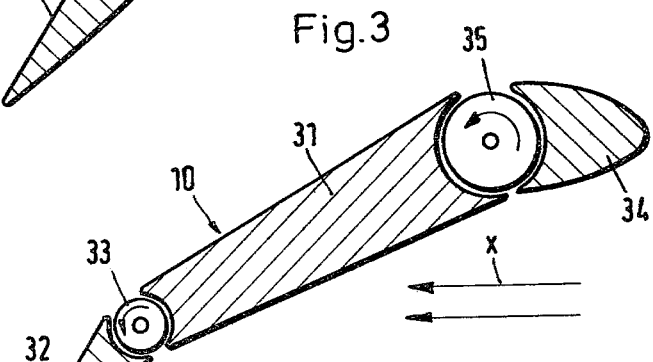
Figure 4:
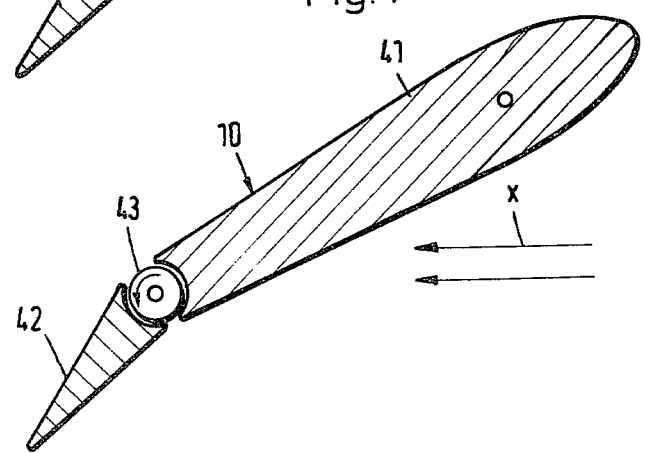
Figure 5:
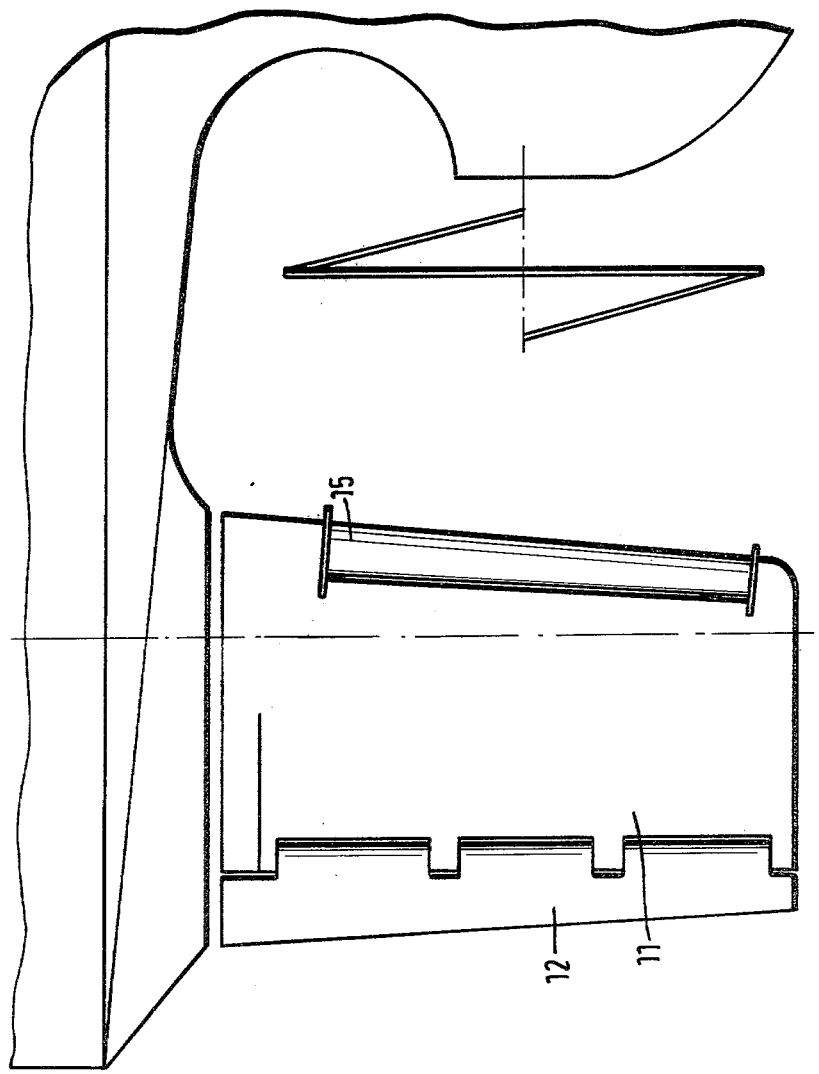
Figure 6:
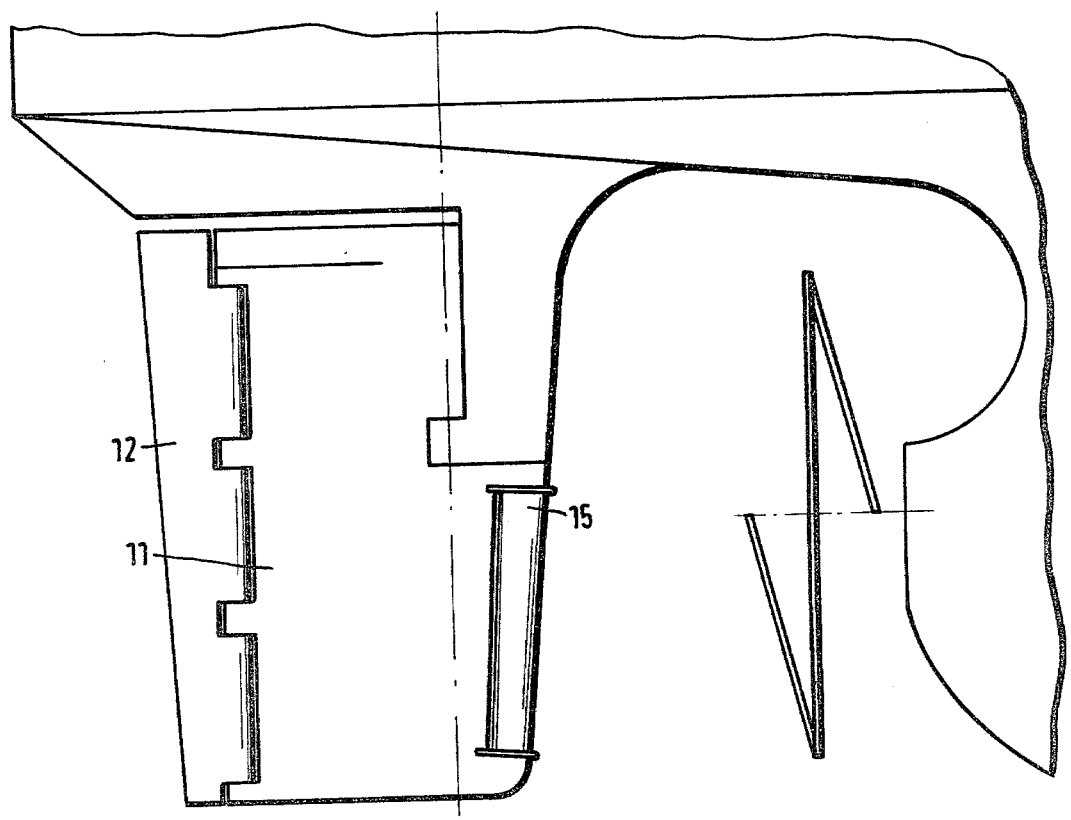
Figure 7:
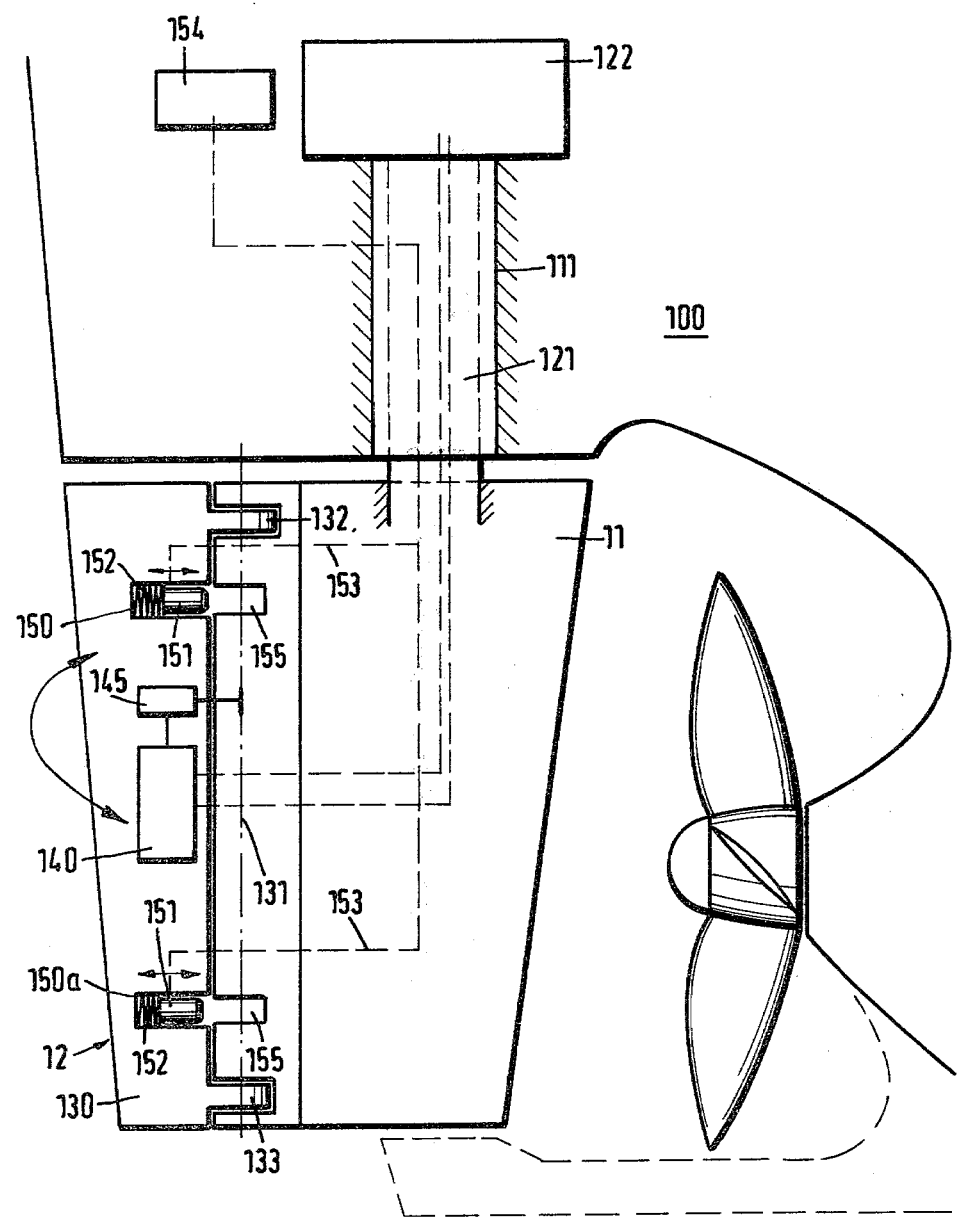

The drawings show the object of the invention by way of example. In the drawings:

FIG. 1 shows a horizontal section through a rudder consisting of a rudder member with a fin and a rotor mounted in front of it, FIG. 2 shows a horizontal section through a rudder consisting of a rudder member with a fin hinged thereto and a guide post provided in front of it, with a rotor mounted between the guide post and the rudder member, FIG. 3 shows a horizontal section through a rudder consisting of a guide post, rudder member and fin, wherein a rotor is provided between the guide post and the rudder member and another rotor is provided between the rudder member and the fin, FIG. 4 shows a horizontal section through a rudder consisting of a rudder member with a fin hinged thereto and a rotor mounted between the rudder member and the fin, FIG. 5 shows a fin-type pivoting rudder with a rotor mounted on its front edge, viewed from the side, FIG. 6 shows a fin-type semi-pivoting rudder with a rotor mounted on the front edge, viewed from the side, and FIG. 7 shows a longitudinal section through a rudder member with a fin and a device for fixing the fin.

The partly balanced rudders shown in FIGS. 1 and 4 may be constructed as spade rudders or semi-pivoting rudders (FIGS. 5 and 6). The lateral surface of the rudder may be rectangular with the constant profile shown; however, it may also be oblique-angled, with the profile generally also varying in thickness as a function of the variation in length. It is also possible for the rear edge to be rounded in the vertical direction.

In FIGS. 1 to 4, the approach flow direction in relation to the rudder is indicated by arrows X.

FIGS. 2 and 3 show unbalance rudders attached to a fixed component. If these components are constructed so as to be freestanding and profiled (as shown), they are so-called guide head rudders. If the component is the rudder post of a ship or a fixed structure on a drilling rig, platform or a floating apparatus or the boom thereof, this is a so-called skegrudder. These rudders may also be rectangular or oblique-angled on their lateral surfaces, or they may be rounded on their rear edges in their height.

As shown by the embodiments of the rudder 10 according to the invention shown in FIGS. 1 to 4, the rudder is made up of a rudder member to which a fin, driven and disengageable from within, is attached.

In FIG. 1, the rudder member of the rudder 10 is designated 11 and the fin is designated 12. In order to improve the suction-side flow in partly balanced rudders according to FIG. 1 a driven rotor 15 is provided in the front edge of the rudder (FIG. 5). However, if the rudder in this embodiment is a semi-pivoting rudder (FIG. 6), the rotor in such an embodiment is mounted only in the movable lower part of the front edge of the rudder.

In order to improve the deflection of flow in the embodiments of FIGS. 3 and 4, a rotor 33 or 43, driven and disengageable from within, is provided between the rudder member 31 or 41 and its fin 32 or 42. This rotor runs in the direction of rotation indicated when the rudder is set to the direction of flow, as shown here. If the rudder is set in the opposite direction, the direction of rotation of the rotor varies accordingly.

According to the embodiments in FIGS. 2 and 3, the rudder member 21 or 31 may have a guide head or fixed component 24 or 34 mounted in front of it. Then, a rotor 25 or 35 is mounted between the rudder member 21 or 31 and the guide head or fixed component 24 or 34, the direction of rotation of this rotor being selected in accordance with the setting of the rudder relative to the approach flow direction, just as in the case of the rearward rotors 33 and 43 described above. On the suction side, the rotor surface has to move in the direction of the approach flow.

Both the rotors and the fins can be driven and disengaged by means of mechanisms known per se. The devices required for this may be mounted both inside the rudder member and inside the fin, and also inside the rotor. The fin angle, fin length and rotor speed are adapted to the particular application, in terms of hydrodynamics. All the rudder elements are automatically regulated.

For pivoting the fin 12, 22, 32 or 42, a drive and adjustment means 140 is provided in FIG. 7. The drive and adjustment means 140 is hereinafter described with reference to the exemplary embodiment of the fin 12.

FIG. 7 shows a ship's body 100, a rudder shank 111 and a rudder member 11 which is connected, via a rudder shaft 121, with a rudder machine shown at 122. The fin 12 of the rudder member is pivotally connected to the rudder member 11 at 132, 133 and is pivotable about the pivot axis shown at 131.

The drive and adjustment means 140 consists of at least one hydraulically or electrically operated motor or a hydraulic cylinder with or without gears 145 provided after it; however, it may also be constructed as a rotor device or a chain drive. The drive and adjustment means 140 is connected to control means provided in the ship's body, which are not shown in the drawings.

Furthermore, the rudder fin 12 can be fixed by means of a locking device 150 and 150a which enables the rudder fin to be fixed in position so that the fin adopts a position parallel to the rudder member 11. This locking device means that a single-body rudder can be obtained. However, the locking device may also be provided on the outside.

Each rudder fin locking device 150 or 150a consists of preferably hydraulically operated locking bolts, pawls, belt or chain brakes or the like 151. The hydraulic cylinder provided for this purpose is connected to a correspondingly constructed drive and control member 154 via a line 153. The locking bolt 151 of the locking device 150 or 150a can be inserted in a correspondingly shaped bore 155 in the rudder member 11 if the rudder fin 12 is to be fixed in place. In case the hydraulic system for the locking bolts 151 fails, automatic locking of the rudder fin 12 can be effected using the rudder member 11. Thus, for the locking bolt 151, prestressing by means of a compression spring 152 is provided, which moves the locking bolt into the locking position if the hydraulic system for operating this bolt 151 fails. The overall arrangement and construction of the locking device 150 or 150a is such that, in the inserted position, the locking bolt 151 acts on the compression spring 152 and compresses it. The hydraulic system holds the locking bolt 151 in this position as long as the rudder fin 12 is freely movable. If the hydraulic system fails, the locking bolt 151 is moved into the locking position by means of the expanding compression spring 152. However, the insertion and withdrawal of the locking bolt 151 may also be effected exclusively by means of the hydraulic drive means. Other technical solutions are also possible. The number of locking devices used depends on the height of the rudder member. However, at least one locking device is used.

The drive and adjustment means 140 for the rudder fin 11 need not be housed in the rudder fin itself. It is also possible to mount the drive and adjustment means 140 in the rudder member 11. In the same way as the drive and adjustment means 140, the locking device 150 or 150a may also be provided in the rudder member 11 so that the locking bolts of the locking members 150 and 150a are then inserted in the rudder fin 12. Moreover, it is possible to arrange the drive and adjustment means 140 so that there is a direct transmission of force to the pivot axis 131 for the fin 12.

We claim:

1. A rudder assembly for aquatic craft comprising: a main rudder member defining a fore-and-aft center line and mounted on said craft for pivotal movement to opposite sides of said center line; a guidehead defining the leading edge of said rotor assembly affixed forwardly of said main rudder member; a fin member mounted at the trailing edge of said main rudder member for pivotal movement relative thereto to opposite sides of said main rudder member; a first rotor interposed between said main rudder member and said guidehead; a second rotor having a diameter smaller than the diameter of said first rotor interposed between said main rudder member and said fin member; said first and said second rotors both mounted for rotation in either one of two opposite directions of rotation about axes lying generally on said center line and extending perpendicularly relative thereto; said first and said second rotors having outer surface areas arranged to be exposed on opposite sides of said rudder assembly to fluid flow past said rudder assembly; the direction of rotation of said first rotor being variable in accordance with the pivotal position of said main rudder member relative to said center line and the direction of rotation of said second rotor being variable in accordance with the pivotal position of said fin member relative to said main rudder member.

2. A rudder assembly according to claim 1, wherein the amount of the outer surface area of each of said first and second rotors exposed to fluid flow on each side of said rudder assembly is greater or lesser depending, respectively, upon the pivotal position of said main rudder member relative to said center line and upon the pivotal position of said fin member relative to said main rudder member, and wherein the direction of rotation of each of said first and said second rotors is individually maintained so that the side thereof having the greater surface area exposed to said fluid flow is moved in the same general direction as the direction of said fluid flow relative to said rudder assembly.

* * * * *

UNITED STATES PATENT OFFICE
CERTIFICATE OF CORRECTION

Patent No. 4,307,677　　　　　　　　　Dated Dec. 29, 1981

Inventor(s) Jastram et al.

It is certified that error appears in the above-identified patent and that said Letters Patent are hereby corrected as shown below:

On the title page item [75] should read as follows:

[75] Inventors: Peter Jastram, Wentorf; Claus Jastram; Jochim Brix, both of Hamburg; Friedrich Weiss, Ahrensburg, all of Fed. Rep. of Germany Signed and Sealed this Eighth Day of February 1983

[SEAL]

Attest:

Attesting Officer

GERALD J. MOSSINGHOFF

Commissioner of Patents and Trademarks